(12) United States Patent
Tsuchikiri et al.

(10) Patent No.: US 7,735,347 B2
(45) Date of Patent: Jun. 15, 2010

(54) IGNITION SWITCH DEVICE

(75) Inventors: Akihiko Tsuchikiri, Hamamatsu (JP); Takehiro Sakai, Sakai (JP); Masaki Ueda, Sakai (JP); Keisuke Miura, Sakai (JP); Hiroshi Kawanami, Sakai (JP); Ikuhiro Uotani, Sakai (JP); Yoshiaki Miyahara, Sakai (JP); Tadayoshi Umemoto, Sakai (JP)

(73) Assignees: Asahi Denso Co., Ltd., Shizuoka (JP); Kubota Corporation, Osaka (JP)

( * ) Notice: Subject to any disclaimer, the term of this patent is extended or adjusted under 35 U.S.C. 154(b) by 0 days.

(21) Appl. No.: 12/127,854

(22) Filed: May 28, 2008

(65) Prior Publication Data

US 2008/0295552 A1 Dec. 4, 2008

(30) Foreign Application Priority Data

May 28, 2007 (JP) .............................. 2007-140469
May 28, 2007 (JP) .............................. 2007-140470

(51) Int. Cl.
 *E05B 15/08* (2006.01)
 *E05B 17/18* (2006.01)
(52) U.S. Cl. .............................. 70/423; 70/427; 70/454; 70/455
(58) Field of Classification Search .................. 70/423, 70/427, 424, 428, 453–455
See application file for complete search history.

(56) References Cited

U.S. PATENT DOCUMENTS

| 1,088,237 | A | * | 2/1914 | Mulford | 70/454 |
|---|---|---|---|---|---|
| 1,112,485 | A | * | 10/1914 | Snyder | 70/452 |
| 1,527,527 | A | * | 2/1925 | Segal | 70/454 |
| 1,648,251 | A | * | 11/1927 | Zygmunt | 70/455 |
| 2,355,300 | A | * | 8/1944 | Johnstone | 70/455 |
| 2,388,228 | A | * | 10/1945 | Johnstone | 70/455 |
| 2,400,229 | A | * | 5/1946 | Freeman | 70/455 |
| 2,562,038 | A | * | 7/1951 | Jacobi | 70/455 |
| 2,598,375 | A | * | 5/1952 | Heinz | 250/466.1 |
| 2,658,151 | A | * | 11/1953 | Heinz | 250/466.1 |
| 2,993,362 | A | * | 7/1961 | Baccolla | 70/454 |
| 3,583,185 | A | * | 6/1971 | Jacobi | 70/455 |
| 5,477,713 | A | * | 12/1995 | Lay | 70/454 |
| 7,322,218 | B2 | * | 1/2008 | Yonemura et al. | 70/162 |
| 7,591,159 | B2 | * | 9/2009 | Tsuchikiri et al. | 70/252 |
| 2005/0193788 | A1 | * | 9/2005 | Weiner | 70/454 |

* cited by examiner

*Primary Examiner*—Lloyd A Gall
(74) *Attorney, Agent, or Firm*—Sughrue Mion, PLLC

(57) ABSTRACT

An ignition switch device is provided with a switch having a key hole allowing a regular ignition key K to be inserted thereinto, and capable of being rotationally operated in a predetermined direction with the ignition key K inserted to start and stop an engine of an industrial machine, a case covering the switch and formed with an insertion hole allowing the key hole to face the outside, and a main guide shape composed of a groove having a V-shaped cross-section, which is formed on the surface of the case, and extending toward the insertion hole to allow the tip Ka of the ignition key K to be guided to the key hole.

16 Claims, 8 Drawing Sheets

10

IGNITION SWITCH DEVICE

This application claims foreign priority from Japanese Patent Application Nos. 2007-140469 filed on May 28, 2007, and 2007-140470 filed on May 28, 2007, the entire contents of which are hereby incorporated by reference.

BACKGROUND OF THE INVENTION

1. Field of the Invention

The present invention relates to an ignition switch device which is disposed in a driver's seat of an industrial machine to start and stop an engine of the industrial machine.

2. Background Art

An industrial machine, for example, a construction machine is used in a worksite of engineering works and construction, and includes bulldozers, power shovels, and crane vehicles. An ignition switch device for starting and stopping an engine of the industrial machine is disposed in the driver's seat of such an industrial machine. By rotationally operating an ignition key while inserting the key into a key hole of such an ignition switch device, the engine is started and stopped.

In addition, generally, an operating lever which makes the industrial machine or equipment (option) provided in the industrial machine perform predetermined operation by rocking operation, and a number of meters which can monitor a running state and an operation state are disposed in the driver's seat of the industrial machine. The ignition switch device to be operated exclusively at the time of the start or stop of the engine is often disposed in a position which is hard to be visually observed by a driver. In addition, since such prior art is not related to inventions well-known in literatures, there is no information on prior art documents to be described.

However, the above conventional ignition switch device is often disposed in a position which is hard to be visually observed by a driver. Thus, there is a problem in that it is necessary to insert the ignition key into the key hole by groping, and the insertion operation of the ignition key into the key hole is extremely difficult. Further, in the ignition switch device, in order to prevent muddy water, dust, etc. from entering the key hole, it is desirable that the key hole is provided with a shutter. However, in a case where the shutter is simply provided, it is possible to open the shutter by groping when the ignition key is inserted into the key hole, and thus the insertion operation of the ignition key into the key hole will be more difficult.

SUMMARY OF THE INVENTION

One or more embodiments of the invention provide an ignition switch device which can facilitate insertion operation of an ignition key into a key hole even in a case where the ignition key is inserted into the key hole by groping.

According to a first aspect of the invention, an ignition switch device disposed in a driver's seat of an industrial machine to start and stop an engine of the industrial machine is provided with: a switching means having a key hole allowing a regular ignition key to be inserted thereinto, and capable of being rotationally operated in a predetermined direction with the ignition key inserted to start and stop the engine of the industrial machine; a case covering the switching means and formed with an insertion hole which allows the key hole to face the outside; and a main guide shape composed of a groove formed on the surface of the case, and extending toward the insertion hole to allow the tip of the ignition key to be guided to the key hole.

According to a second aspect of the invention, in the ignition switch device of the first aspect, the main guide shape may be composed of a groove having a V-shaped cross-section.

According to a third aspect of the invention, the ignition switch device of the first or second aspect may be provided with a shutter disposed on the surface of the case, and rotatable between a closed position where the insertion hole of the case is closed and an open position where the insertion hole is opened to allow the key hole to face outside; and an auxiliary guide shape formed on the surface of the case along a contour edge of the shutter in the closed position, and extending toward the main guide shape to allow the tip of the ignition key to be guided to the main guide shape.

According to a fourth aspect of the invention, in the ignition switch device of the third aspect, a cutout which allows the tip of the ignition key guided by the main guide shape to abut thereon may be formed in a position on an extension of the main guide shape of the shutter.

According to a fifth aspect of the invention, in the ignition switch device of any one of first to fourth aspects, a stepped portion may be formed in a boundary portion between the surface of the case, and the main guide shape.

Moreover, according to a sixth aspect of the invention, an ignition switch device disposed in a driver's seat of an industrial machine to start or stop an engine of the industrial machine is provided with: a switching means having a key hole allowing a regular ignition key to be inserted thereinto, and capable of being rotationally operated in a predetermined direction with the ignition key inserted to start and stop the engine of the industrial machine; a case covering the switching means and formed with an insertion hole allowing the key hole to face the outside; a shutter disposed on the surface of the case, and rotatable between a closed position where the insertion hole of the case is closed and an open position where the insertion hole is opened to allow the key hole to face the outside; and a cutout formed in the shutter and allowing the tip of the ignition key to abut thereon, thereby rotating the shutter in the closed position to the open position. The tip of the ignition key is aligned with the key hole while the tip of the ignition key is made to abut on the cutout, and the shutter is pressed and rotated to the open position.

According to a seventh aspect of the invention, in the ignition switch device of sixth aspect, the shutter may be always biased in a direction in which the shutter is in the closed position, and the cutout of the shutter may be formed in a circular arc.

According to an eighth aspect of the invention, the ignition switch device of the sixth or seventh aspect may be provided with a main guide shape composed of a groove having a V-shaped cross-section, which is formed in the surface of the case, and extending toward the cutout of the shutter in the closed position to allow the tip of the ignition key to be guided to the cutout.

According to a ninth aspect of the invention, the ignition switch device of the eighth aspect may be provided with an auxiliary guide shape formed on the surface of the case along a contour edge of the shutter in the closed position, and extending toward the main guide shape to allow the tip of the ignition key to be guided to the main guide shape.

According to the first aspect, the main guide shape which is composed of a groove formed in the surface of a case, and which can guide the tip of the ignition key to the key hole is provided. Thus, even in a case where the ignition key is inserted into the key hole by groping, insertion operation of the ignition key into the key hole can be made easy.

According to the second aspect, the main guide shape is composed of a groove having a V-shaped cross-section. Thus, the main guide shape matches the shape of the tip of the ignition key so that it can guide the tip satisfactorily.

According to the third aspect, the auxiliary guide shape which allows the tip of the ignition key to be guided to the main guide shape is formed on the surface of the case. Further, the auxiliary guide shape is formed on the surface of the case along a contour edge of the shutter in the closed position. Thus, the auxiliary guide shape can surely guide the tip of the ignition key to the main guide shape, utilizing the thickness of the shutter.

According to the fourth aspect, a cutout which allows the tip of the ignition key guided by the main guide shape to abut thereon is formed in a position on an extension of the main guide shape of the shutter. Thus, if the tip of the ignition key which has abutted on the cutout is operated toward the open position of the shutter as it is, the shutter is rotated so that the tip of the ignition key can be inserted into the key hole.

According to the fifth aspect, a stepped portion is formed in a boundary portion between the surface of the case, and the main guide shape. Thus, the tip of the ignition key can be prevented from coming out of the main guide shape while being guided by the main guide shape, and the tip of the ignition key can be surely guided to the key hole.

According to the sixth aspect, while the shutter is pressed and rotated to the open position while the tip of the ignition key is made to abut on the cutout, the tip of ignition key is aligned with the key hole. Thus, if the ignition key is pushed in as it is after the matching, the key can be inserted into the key hole. Also, even in a case where the ignition key is inserted into the key hole by groping, insertion operation of the ignition key into the key hole can be made easy.

According to the seventh aspect, the shutter is always biased in a direction in which the shutter is in the closed position, and the cutout of the shutter is formed in a circular arc. Thus, the rotational operation of the ignition key inserted into the key hole can be smoothly performed.

According to the eighth aspect, the ignition switch device includes a main guide shape composed of a groove having a V-shaped cross-section, which is formed in the surface of the case, and extending toward the cutout of the shutter in the closed position to allow the tip of the ignition key to be guided to the cutout. Insertion operation of the ignition key into the key hole when the ignition key is inserted into the key hole by groping can be made easier.

According to the ninth aspect, since the auxiliary guide shape which can guide the tip of the ignition key to the main guide shape 5 is formed on the surface of the case, insertion operation of the ignition key into the key hole can be made easier. Further, since the auxiliary guide shape is formed on the surface of the case along a contour edge of the shutter in the closed position, the auxiliary guide shape can surely guide the tip of the ignition key to the main guide shape, utilizing the thickness of the shutter.

Other aspects and advantages of the invention will be apparent from the following description, the drawings and the claims.

REFERENCE NUMERALS

1: IGNITION SWITCH DEVICE
2: SWITCHING MEANS
2*a*: KEY HOLE
3: CASE
3*a*: SURFACE
3*b*: INSERTION HOLE
4: SHUTTER
4*a*: CUTOUT
5: MAIN GUIDE SHAPE
5*a*: STEPPED PORTION
6: AUXILIARY GUIDE SHAPE
K: IGNITION KEY
Ka: TIP

DETAILED DESCRIPTION OF THE EXEMPLARY EMBODIMENTS

Figure 1:
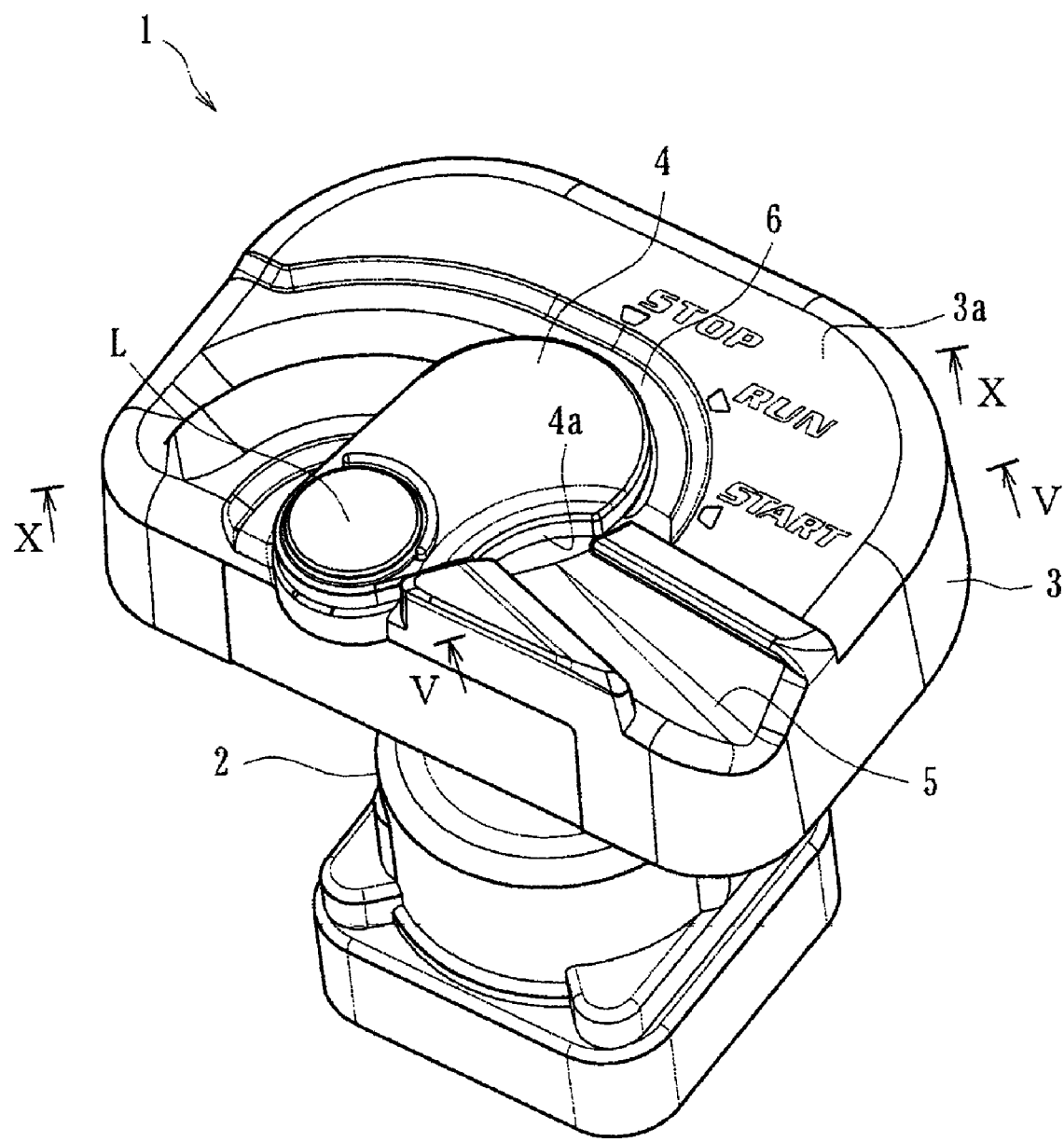
FIG. 1 is a perspective view showing an ignition switch device related to an embodiment of the invention.

An exemplary embodiment of the invention will be specifically explained with reference to the drawings. An ignition switch device related to the present embodiment is disposed in driver's seats of industrial machines (construction machines), such as bulldozers, power shovels, or crane vehicles to be used in worksites of engineering works or construction. As shown in FIG. 1, the ignition switch device is mainly composed of a switching means 2, a case 3, a shutter 4, a main guide shape 5, and an auxiliary guide shape 6.

The switching means 2 includes a key hole 2*a* (refer to FIG. 3) which allows a regular ignition key K to be inserted thereinto, and can be operated to rotate in a predetermined direction with the ignition key K inserted thereinto to thereby start and stop the engine of an industrial machine. Specifically, the switching means 2 constitutes a cylinder lock in which a plurality of tumblers are provided within the key hole 2*a*, or a versatile ignition switch including a switch board or the like which can be switched by forming or breaking a predetermined electric circuit by the rotation of the cylinder lock.

Figure 5:
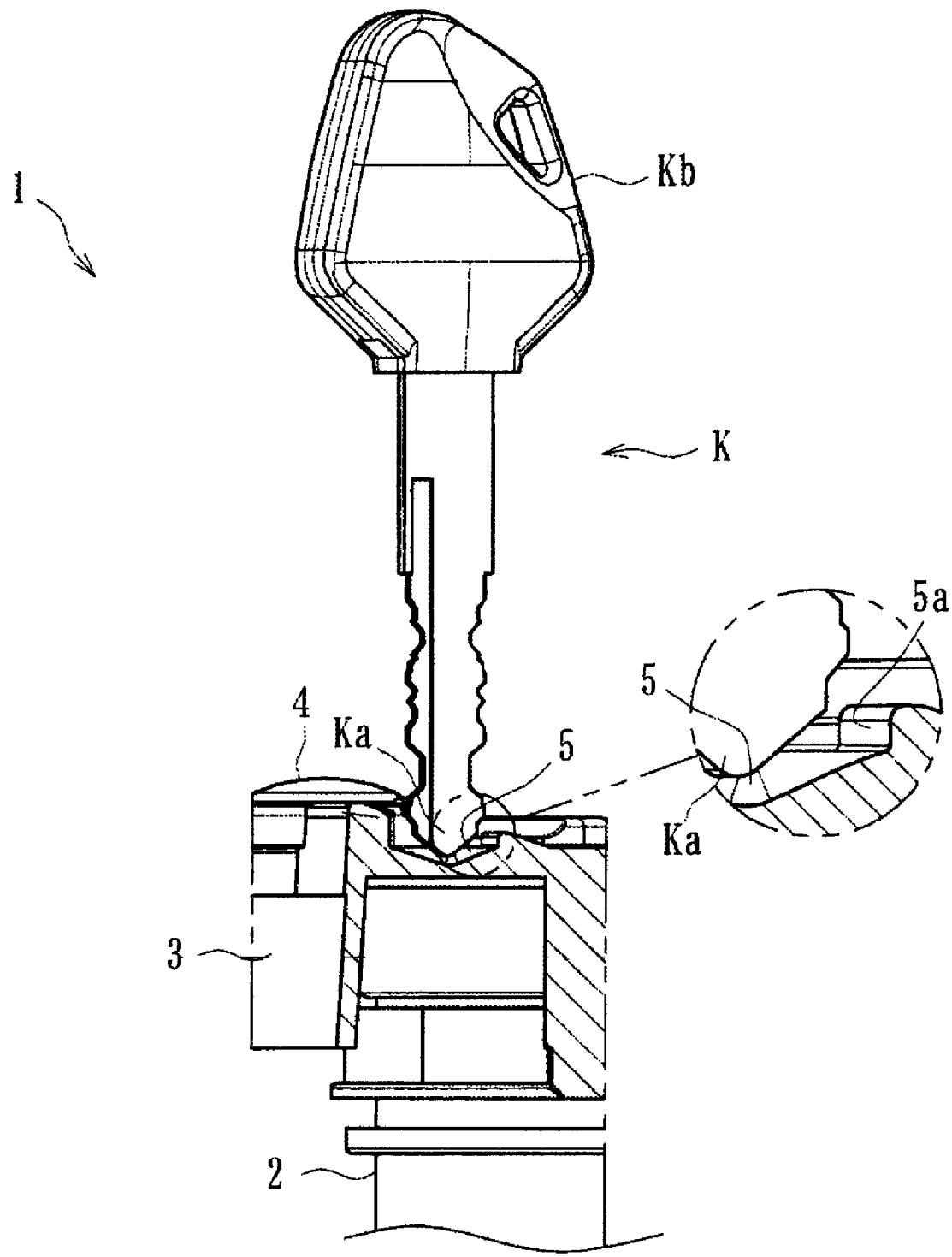
FIG. 5 is a sectional view taken along the line V-V in FIG. 1.

The ignition key K, as shown in FIG. 5, is formed in the shape of a key while its tip (protruding end) Ka is formed in the shape of V, and is configured such that, if the ignition key is a regular one, the shape of the key matches the shape of the tumblers of the cylinder lock in the switching means 2 so that the cylinder lock can be rotated. In addition, reference numeral Kb denotes a gripping portion of the ignition key K, and a driver grips the gripping portion Kb to operate the ignition key K.

The case 3 is formed with a through hole 3b which allows the key hole 2a to face outside while covering an upper portion of the switching means 2, and printed letters or the like which indicate the position of the ignition key K are given to the surface 3a of the case. Further, the case 3 is a resin-molded product obtained by molding predetermined resin, and various shapes, such as the main guide shape 5 and the auxiliary guide shape 6 which will be explained in detail, are built in the surface of the case at the time of manufacture.

Figure 2:
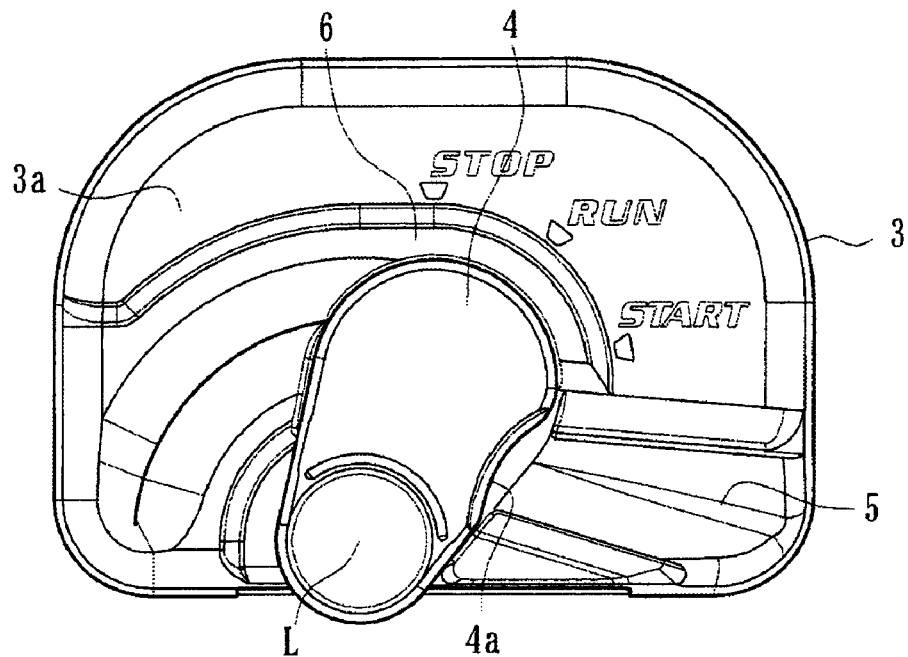
FIG. 2 is a plan view showing the ignition switch device (a shutter is in a closed position).
Figure 3:
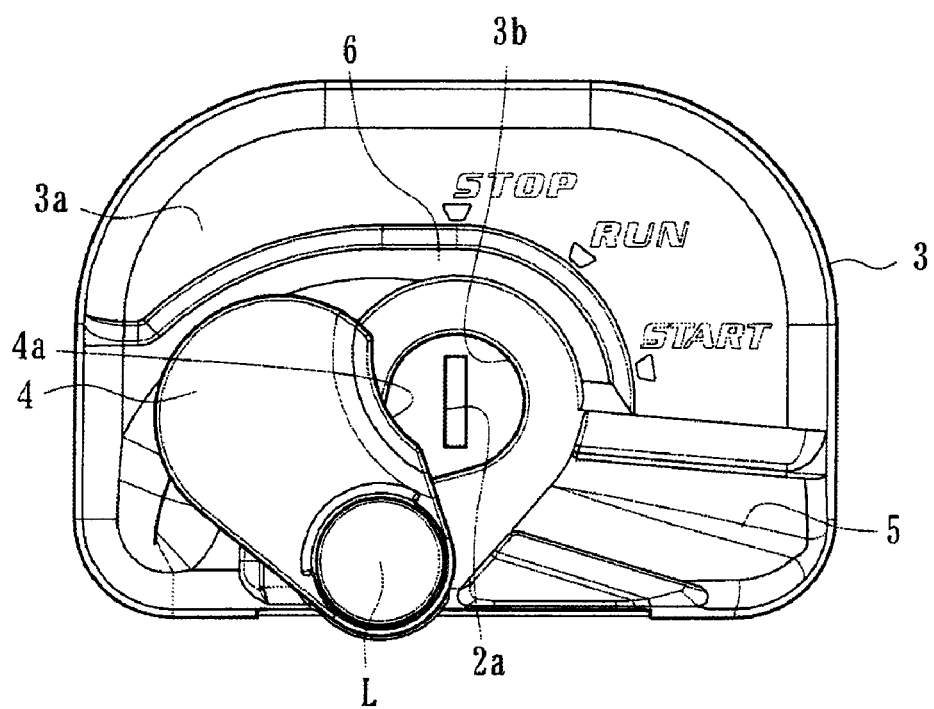
FIG. 3 is a plan view showing the ignition switch device (the shutter is in an open position).

The shutter 4 is disposed on the surface 3a of the case 3. As shown in FIGS. 2 and 3, the shutter is adapted to be rotatable about a rotary shaft L between a closed position (position shown in FIG. 2) where the insertion hole 3b of the case 3 is closed, and an open position (position shown in FIG. 3) where the insertion hole 3b is opened to allow the key hole 2a to face the outside (the upside). Thereby, when such a shutter 4 is in the closed position, the shutter can cover the key hole 2a to prevent muddy water, dust, etc. from entering the key hole.

Further, the shutter 4 is biased in a direction in which the shutter is always in the closed position by a spring (torsion coil spring or the like biased toward the closed position) which is not shown. When the ignition key K is pulled out, the shutter 4 in the open position is rotated to the closed position and is naturally closed by the biasing force of the spring. Thereby, after the ignition key K is pulled out of the keyhole 2a, the operation which closes the shutter 4 becomes unnecessary, and consequently, operability can be further improved.

Figure 4:
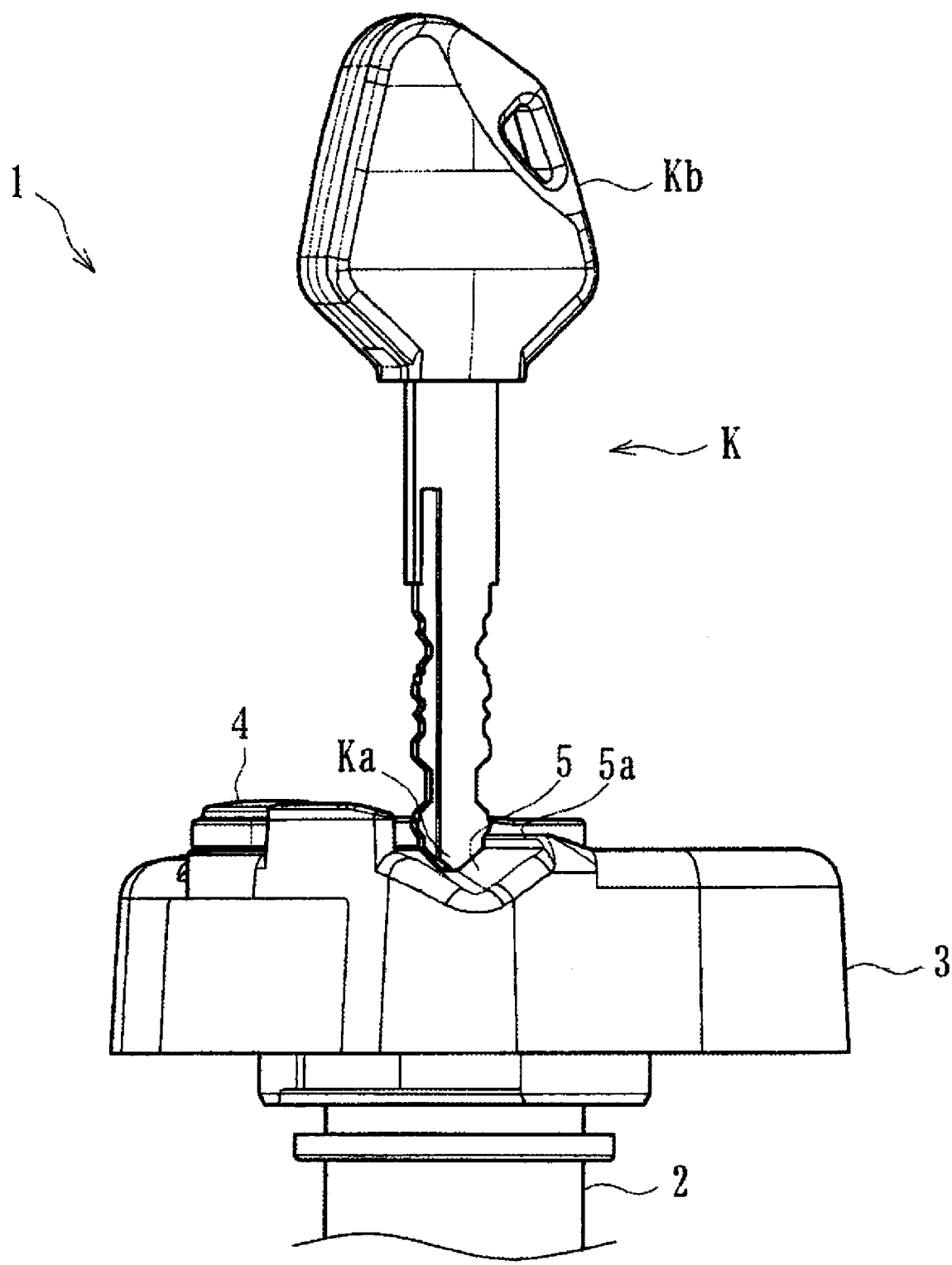
FIG. 4 is a view as seen from the side surface in the ignition switch device, and is a view showing a process in which an ignition key is guided by a main guide shape.

As shown in FIGS. 4 and 5, the main guide shape 5 is composed of a groove having a V-shaped cross-section, which is formed in the surface 3a of the case 3, and extends toward the insertion hole 3b (strictly speaking, cutout 4a of the shutter 4 which covers the insertion hole 3b) so that it can guide the tip Ka of the ignition key K to the key hole 2a. The main guide shape 5 extends substantially linearly to the insertion hole 3b from the edge of the case 3, and is configured such that its width becomes narrow toward the insertion hole 3b from the edge.

Figure 6:
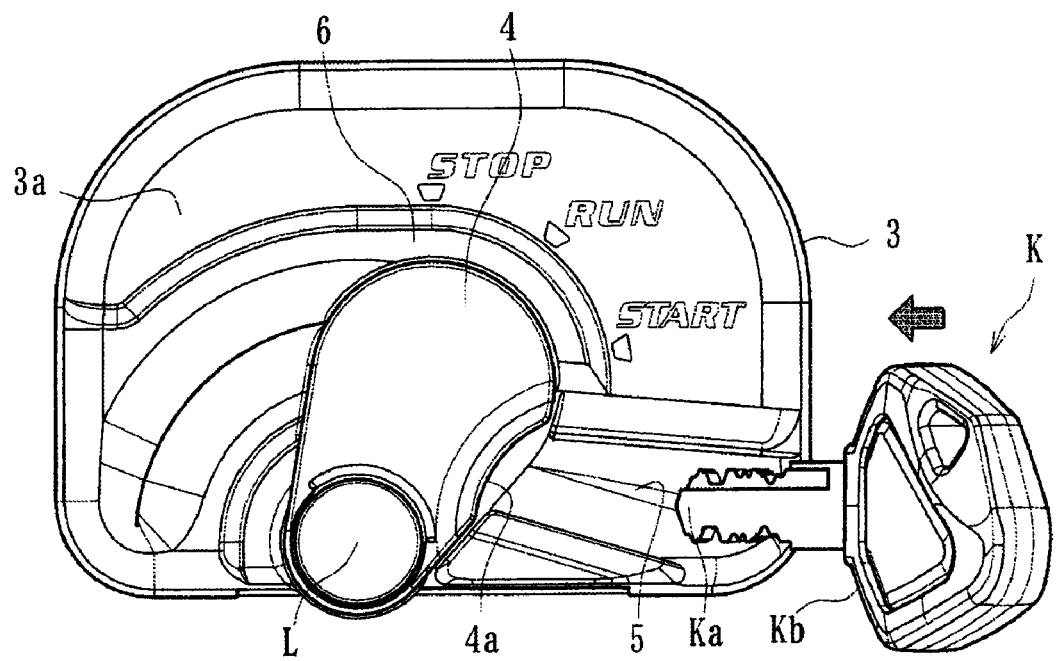
FIG. 6 is a view as seen from the upper surface in the ignition switch device, and is a view showing a process in which the ignition key is guided by the main guide shape.
Figure 7:
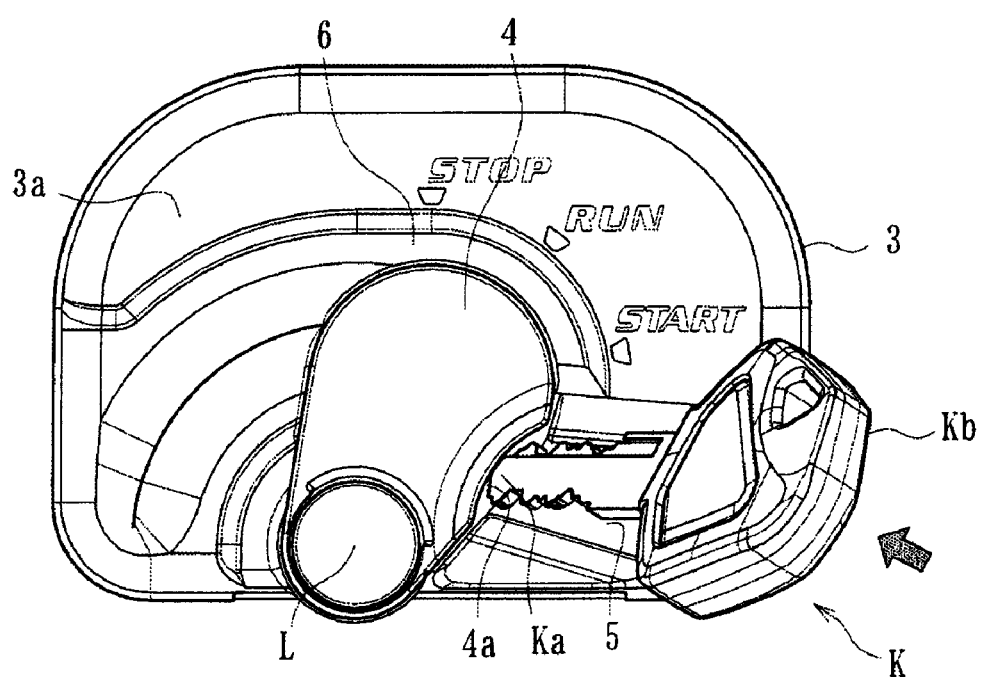
FIG. 7 is a view as seen from the upper surface in the ignition switch device, and is a view showing a state in which the ignition key guided by the main guide shape has abutted on a cutout of the shutter.

Thus, if a driver who sits down on a driver's seat suitably moves the tip Ka of the ignition key K along the surface 3a of the case 3 and makes the key reach the main guide shape 5 as shown in FIG. 6 in order to start the engine of an industrial machine, the ignition key K is moved along the main guide shape from there. Thereby, as shown in FIG. 7, the tip Ka can be guided to the key hole 2a (cutout 4a of the shutter 4) without visual observation. In addition, since the main guide shape 5 is composed of a groove having a V-shaped cross-section, as shown in FIG. 5, the main guide shape matches the shape of the tip Ka of the ignition key K so that it can guide the tip Ka satisfactorily.

Further, as shown in FIG. 5, a stepped portion 5a is formed in a boundary portion between the surface 3a of the case 3 and the main guide shape 5. While the tip Ka of the ignition key K is moved to the main guide shape 5 along the surface 3a of the case 3, the tip Ka is made to reach the main guide shape 5 by slipping off of the stepped portion 5a. Meanwhile, any movement of the tip Ka of the ignition key K to the surface 3a of the case 3 while being guided by the main guide shape 5 can be regulated.

That is, the stepped portion 5a has a rising gradient (wall) when the tip Ka of the ignition key K moves toward the surface 3a of the case 3 from the main guide shape 5, and consequently regulates any movement of the tip in the rising direction. Also the stepped portion has a falling gradient when the tip moves toward the main guide shape 5 from the surface 3a, and consequently can make the tip smoothly reach the main guide shape 5 by slipping off the stepped portion 5a rather than hindering any movement of the tip in the falling direction. Accordingly, according to the stepped portion 5a of the present embodiment, the tip Ka of the ignition key K can be prevented from coming out of the main guide shape 5 while being guided by the main guide shape 5, and the tip Ka of the ignition key K can be surely guided to the key hole 2a.

Figure 10:
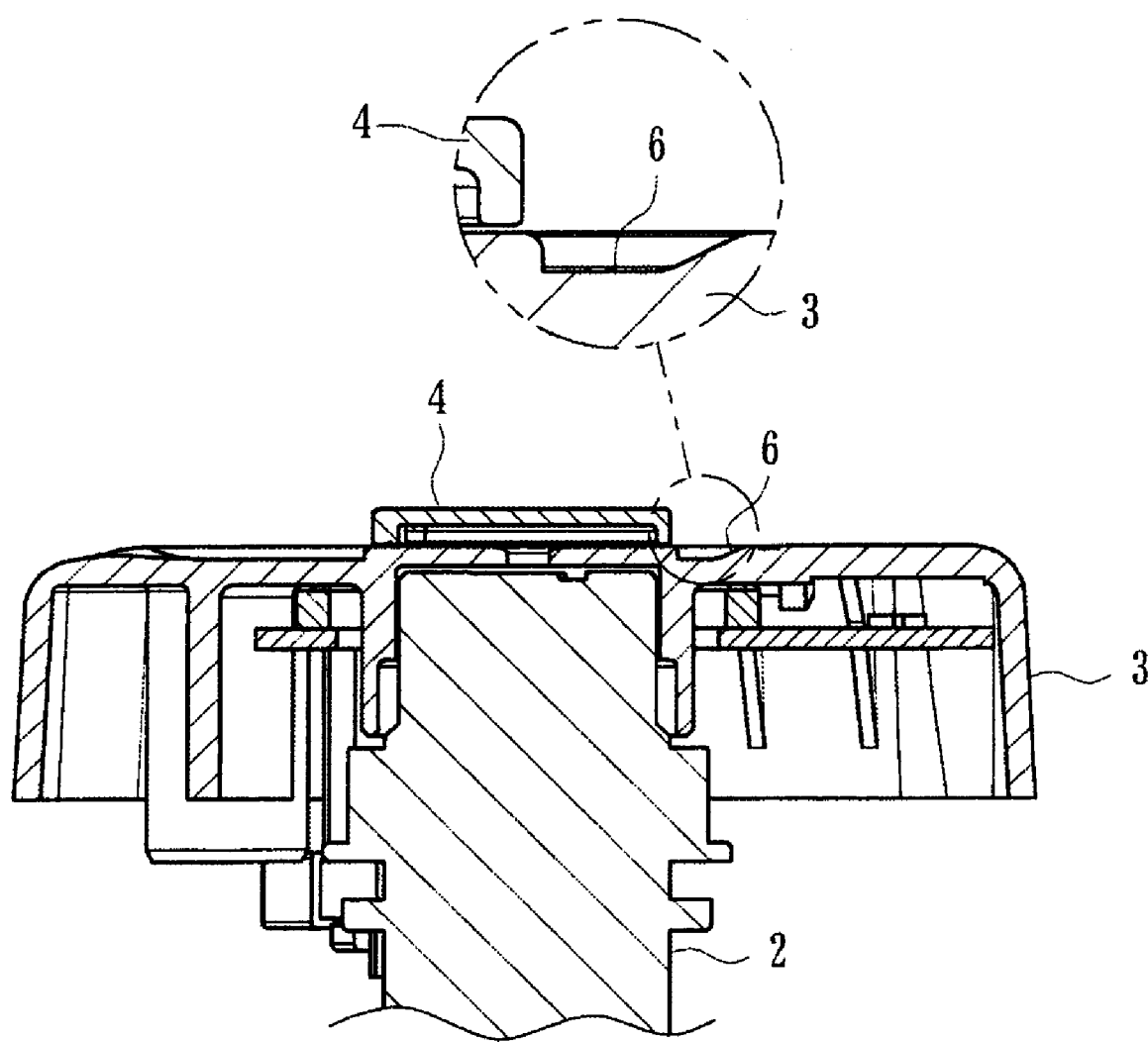
FIG. 10 is a sectional view taken along the line X-X in FIG. 1.

As shown in FIGS. 2 and 10, the auxiliary guide shape 6 is formed on the surface 3a of the case 3 along a contour edge of the shutter 4 in the closed position, and extends toward the main guide shape 5 so that it can guide the tip Ka of the ignition key K to the main guide shape 5. That is, an upper (the side where printed letters are given) contour edge in the shutter 4 is formed in a circular arc as shown in the drawing, and the tip of the auxiliary guide shape communicates with the main guide shape 5 while the auxiliary guide shape 6 is formed along such a circular arc. Thus, if the tip Ka of the ignition key K is moved along the auxiliary guide shape 6, it reaches the main guide shape 5 from which it can be guided to the insertion hole 3b as described above. Further, since the auxiliary guide shape 6 is formed on the surface 3a of the case 3 along a contour edge of the shutter 4 in the closed position, the auxiliary guide shape can surely guide the tip Ka of the ignition key K to the main guide shape 5, utilizing the thickness of the shutter 4.

Meanwhile, a circular-arc cutout 4a which allows the tip Ka of the ignition key K guided by the main guide shape 5 to abut thereon is formed in a position on an extension of the main guide shape 5 of the shutter 4. Also, as shown in FIG. 7, if the tip Ka of the ignition key K guided by the main guide shape 5 is made to abut on the cutout 4a, and thereafter further moved in this direction, the tip Ka presses the shutter 4 via the cutout 4a so that the shutter 4 can be rotated about the rotary shaft L.

Figure 8:
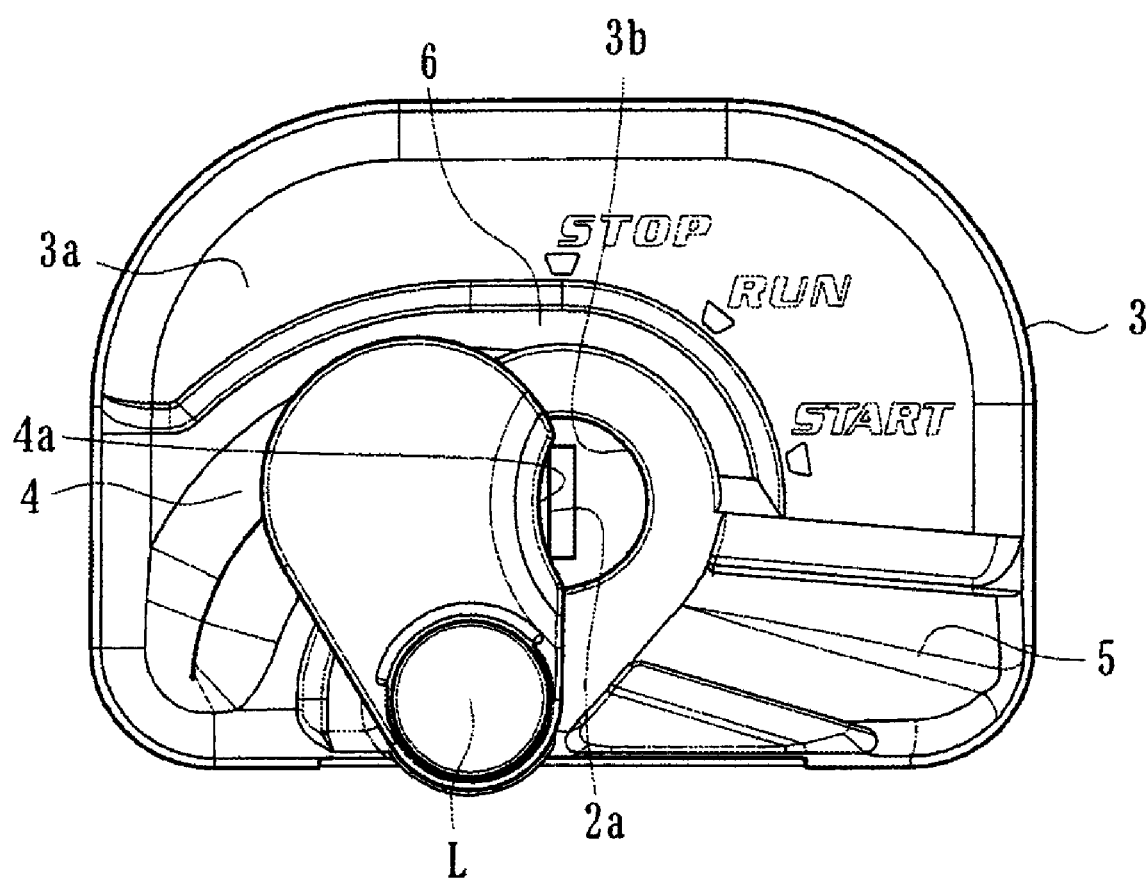
FIG. 8 is a sectional schematic view showing the positional relationship between the cutout of the shutter and the key hole in the ignition switch device.
Figure 9:
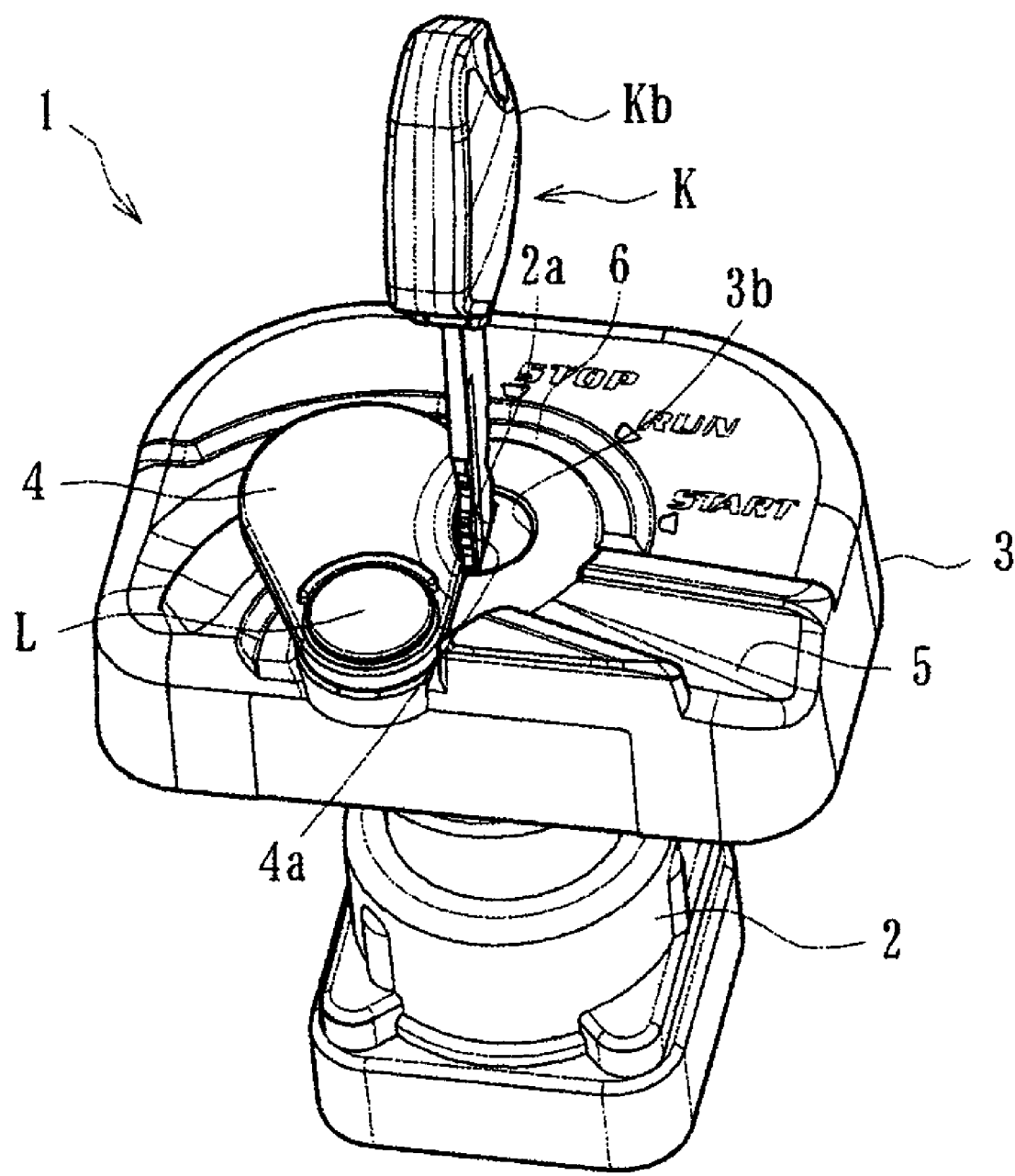
FIG. 9 is a perspective view showing a state where the ignition key has matched the key hole in the ignition switch device.

Here, in the present embodiment, as shown in FIG. 8, during the rotation of the shutter 4, the cutout 4a and the key hole 2a are set so as to be parallel to each other, and the tip Ka of the ignition key K which is pressing the cutout 4a is configured so as to match the formation position of, or be aligned with the key hole 2a. Thus, while the shutter 4 is rotated to the open position by the tip Ka of the ignition key K, as shown in FIG. 9, the tip Ka of the ignition key K matches the key hole 2a of the ignition key K (matching in position and direction). If the ignition key K is pushed into the switching means 2 from this state, the key can be inserted into the key hole 2a.

Thereafter, if the ignition key K inserted into the key hole 2a is rotated in a predetermined direction (right direction in the present embodiment), the switching means 2 can be operated to start the engine of the industrial machine. Further, if the ignition key K is rotated in an opposite direction (left direction in the present embodiment) in order to stop the engine of the industrial machine, the switching means 2 can be operated to stop the engine.

In addition, since the shutter 4 is biased toward the closed position at the time of the rotation of the ignition key K as described above, the cutout 4a and the ignition key K are in an abutting state. However, since the cutout 4a is formed in a circular arc, the rotational operation of the ignition key K can be smoothly performed. Also, if the ignition key K is pulled out of the key hole 2a, as already mentioned, the shutter 4 will be rotated to the closed position and naturally closed by the biasing force of the spring.

According to the ignition switch device 1 related to the above embodiment, the main guide shape 5 which is composed of a groove having a V-shaped cross-section, which is formed in the surface 3a of a case 3, and which can guide the tip Ka of the ignition key K to the key hole 2a is provided. Thus, even in a case where the ignition key K is inserted into the key hole 2a by groping, insertion operation of the ignition key K into the key hole 2a can be made easy. Further, since the auxiliary guide shape 6 which can guide the tip Ka of the ignition key K to the main guide shape 5 is formed on the surface 3a of the case 3, insertion operation of the ignition key K into the key hole 2a can be made easier.

Further, while the shutter 4 is pressed and rotated to the open position while the tip Ka of the ignition key K is made to abut on the cutout 4a, the tip Ka of ignition key K matches the formation position of the key hole 2a. Thus, if the ignition key K is pushed in as it is after the matching, the key can be inserted into the key hole 2a. Consequently, even in a case where the ignition key K is inserted into the key hole 2a by groping, insertion operation of the ignition key K into the key hole Ka can be made easier.

In addition, in the present embodiment, a driver who is going to start the engine finds the key hole not with his/her eyes, but with his/her hand. If the tip Ka of the ignition key K abuts on the surface 3a of the case 3, is suitably moved along the surface 3a as it is, and thereby inserted into the main guide shape 5 or the auxiliary guide shape 6, the tip Ka is guided to the shutter 4 which covers the insertion hole 3b along the main guide shape 5 and the auxiliary guide shape 6. Then, if the tip is further moved in this direction from the state where it abuts on the cutout 4a of the shutter 4, the shutter 4 can be rotated and be guided to the key hole 2a.

Although the present embodiment has been described hitherto, the invention is not limited thereto. For example, the invention can also be applied to ignition switch devices which do not include the shutter 4. That is, the insertion hole 3b of the case 3 may not be closed, but the key hole 2a may be always made to face the outside. Also, the main guide shape 5 may be formed so as to extend toward the key hole (insertion hole) The main guide shape 5 is not limited to a groove having a V-shaped cross-section. For example, the main guide shape may be a groove having a U-shaped cross-section.

Further, the cutout 4a may not be formed in the shutter 4, and the tip Ka of the ignition key K may be made to directly abut on the contour edge of the shutter 4. Furthermore, in the present embodiment, the auxiliary guide shape 6 which extends to the main guide shape 5 is formed in addition to the main guide shape 5. Instead of this, however, the auxiliary guide shape 6 may not be formed, but only the main guide shape 5 may be formed.

Further, for example, the main guide shape 5 or the auxiliary guide shape 6 may not be formed in the surface 3a of the case 3. That is, if the tip Ka of the ignition key K is made to abut the cutout 4a, the tip Ka and the key hole 2a match each other while the tip presses and rotates the shutter 4. Thus, insertion operation of the ignition key K by groping becomes easy.

Further, the cutout of the shutter 4 is not limited to a circular-arc shape, but may be other shapes (rectangular shape, etc.) on which the tip Ka of the ignition key K can abut.

In addition, industrial machines to which the invention can be applied include, for example, various machines, such as bulldozers, scrape dozers, hydraulic shovels (backhoes, power shovels, etc.), and tractors with a crane apparatus.

While description has been made in connection with specific exemplary embodiment and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. An ignition switch device for a driver's seat of an industrial machine to start and stop an engine of the industrial machine, the ignition switch device comprising:
    a switching means having a key hole allowing a regular ignition key to be inserted thereinto, and capable of being rotationally operated in a predetermined direction with the inserted ignition key to start and stop the engine of the industrial machine;
    a case covering the switching means and formed with an insertion hole allowing the key hole to face the outside;
    a main guide shape formed by a groove formed on a surface of the case, and extending toward the insertion hole to allow the tip of the ignition key to be guided to the key hole;
    the main guide shape extending from an edge of the case toward the insertion hole;
    a shutter disposed on the surface of the case, and rotatable between a closed position where the insertion hole of the case is closed and an open position wherein the insertion hole is opened to allow the key hole to face outside; and
    an auxiliary guide shape formed on the surface of the case along a contour edge of the shutter in the closed position, and extending toward the main guide shape to allow the tip of the ignition key to be guided to the main guide shape.

2. The ignition switch device according to claim 1, wherein the main guide shape is formed by a groove having a V-shaped cross-section.

3. The ignition switch device according to claim 1, wherein a cutout which allows the tip of the ignition key guided by the main guide shape to abut thereon is formed in a position on an extension of the main guide shape of the shutter.

4. The ignition switch device according to claim 1, wherein a tip of the auxiliary guide shape communicates with the main guide shape.

5. The ignition switch device according to claim 1, wherein the main guide shape includes a straight portion that extends toward the insertion hole.

6. The ignition switch device according to claim 1, wherein a bottom of the groove of the main guide shape is lower than the surface of the case.

7. An ignition switch device for a driver's seat of an industrial machine to start and stop an engine of the industrial machine, the ignition switch device comprising:
    a switching means having a key hole allowing a regular ignition key to be inserted thereinto, and capable of being rotationally operated in a predetermined direction with the inserted ignition key to start and stop the engine of the industrial machine;
    a case covering the switching means and formed with an insertion hole allowing the key hole to face the outside; and
    a main guide shape formed by a groove formed on a surface of the case, and extending toward the insertion hole to allow the tip of the ignition key to be guided to the key hole;
    wherein the main guide shape extends from an edge of the case toward the insertion hole, and
    wherein a stepped portion is formed in a boundary portion between the surface of the case and the main guide shape.

8. An ignition switch device for a driver's seat of an industrial machine to start or stop an engine of the industrial machine, the ignition switch device comprising:
- a switching means having a key hole allowing a regular ignition key to be inserted thereinto, and capable of being rotationally operated in a predetermined direction with the ignition key inserted to start and stop the engine of the industrial machine;
- a case covering the switching means and formed with an insertion hole allowing the key hole to face the outside;
- a shutter disposed on a surface of the case, and rotatable between a closed position where the insertion hole of the case is closed and an open position where the insertion hole is opened to allow the key hole to face the outside;
- a cutout formed in the shutter and allowing the tip of the ignition key to abut thereon, thereby rotating the shutter in the closed position to the open positions,
- a main guide shape formed by a groove having a V-shaped cross-section, which is formed in the surface of the case, and extending toward the cutout of the shutter in the closed position to allow the tip of the ignition key to be guided to the cutout; and
- an auxiliary guide shape formed on the surface of the case along a contour edge of the shutter in the closed position, and extending toward the main guide shape to allow the tip of the ignition key to be guided to the main guide shape,
- wherein the tip of the ignition key is aligned with the key hole while the tip of the ignition key is made to abut on the cutout, and the shutter is pressed and rotated to the open position.

9. The ignition switch device according to claim 8, wherein the shutter is always biased in a direction in which the shutter is in the closed position, and the cutout of the shutter is formed in a circular arc.

10. The ignition switch device according to claim 8, wherein the cutout and the key hole extend substantially parallel to each other when the shutter is in the open position.

11. An ignition switch device for a driver's seat of an industrial machine to start and stop an engine of the industrial machine, the ignition switch device comprising:
- a switching means having a key hole allowing a regular ignition key to be inserted thereinto, and capable of being rotationally operated in a predetermined direction with the inserted ignition key to start and stop the engine of the industrial machine;
- a case covering the switching means and formed with an insertion hole allowing the key hole to face the outside;
- a main guide shape formed by a groove formed on a surface of the case, and extending toward the insertion hole to allow the tip of the ignition key to be guided to the key hole, the main guide shape having a width that decreases as it extends toward the insertion hole;
- a shutter disposed on the surface of the case, and rotatable between a closed position where the insertion hole of the case is closed and an open position wherein the insertion hole is opened to allow the key hole to face outside; and
- an auxiliary guide shape formed on the surface of the case along a contour edge of the shutter in the closed position, and extending toward the main guide shape to allow the tip of the ignition key to be guided to the main guide shape.

12. The ignition switch device according to claim 11, wherein the main guide shape is formed by a groove having a V-shaped cross-section.

13. The ignition switch device according to claim 11, wherein a cutout which allows the tip of the ignition key guided by the main guide shape to abut thereon is formed in a position on an extension of the main guide shape of the shutter.

14. The ignition switch device according to claim 11, wherein a tip of the auxiliary guide shape communicates with the main guide shape.

15. The ignition switch device according to claim 11, wherein a bottom of the groove of the main guide shape is lower than the surface of the case.

16. An ignition switch device for a driver's seat of an industrial machine to start and stop an engine of the industrial machine, the ignition switch device comprising:
- a switching means having a key hole allowing a regular ignition key to be inserted thereinto, and capable of being rotationally operated in a predetermined direction with the inserted ignition key to start and stop the engine of the industrial machine;
- a case covering the switching means and formed with an insertion hole allowing the key hole to face the outside; and
- a main guide shape formed by a groove formed on a surface of the case, and extending toward the insertion hole to allow the tip of the ignition key to be guided to the key hole,
- wherein the main guide shape has a width that decreases as it extends toward the insertion hole, and
- wherein a stepped portion is formed in a boundary portion between the surface of the case and the main guide shape.

* * * * *